(12) United States Patent
McDaniel

(10) Patent No.: US 6,700,838 B1
(45) Date of Patent: Mar. 2, 2004

(54) PLANAR COIL STRUCTURE FOR MAGNETO-OPTICAL HEAD

(75) Inventor: Terry W. McDaniel, Morgan Hill, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 178 days.

(21) Appl. No.: 09/818,029

(22) Filed: Mar. 26, 2001

Related U.S. Application Data

(60) Provisional application No. 60/191,942, filed on Mar. 24, 2000.

(51) Int. Cl.$^7$ .................................. G11B 11/00

(52) U.S. Cl. .................. 369/13.13; 369/13.23

(58) Field of Search ................ 369/13.13, 13.33, 369/112.23, 118, 13.32, 13.17, 13.23

(56) References Cited

U.S. PATENT DOCUMENTS

| | | | |
|---|---|---|---|
| 5,883,872 A | * | 3/1999 | Kino ........................... 369/112 |
| 5,886,959 A | | 3/1999 | Bischoff et al. ............... 369/13 |
| 5,903,525 A | | 5/1999 | McDaniel et al. |
| 6,034,938 A | | 3/2000 | Heanue et al. ............... 369/112 |
| 6,046,966 A | | 4/2000 | Drake et al. ................... 369/13 |
| 6,055,220 A | * | 4/2000 | Mamin et al. ............... 369/112 |
| 6,081,499 A | | 6/2000 | Berger et al. ................ 369/112 |
| 6,104,675 A | | 8/2000 | Hatam-Tabrizi ............. 369/13 |
| 6,320,708 B1 | * | 11/2001 | Ueyanagi et al. ........... 359/824 |
| 6,396,776 B1 | * | 5/2002 | Ueyanagi ................. 369/13.33 |

\* cited by examiner

*Primary Examiner*—Tan Dinh
(74) *Attorney, Agent, or Firm*—Moser, Patterson & Sheridan

(57) ABSTRACT

A coil structure apparatus comprising a yoke portion and a coil portion. The yoke portion substantially surrounds the coil portion. In one aspect, the yoke portion is configured to increase the bias field strength produced by the coil structure while minimizing the self-inductance of the coil structure.

20 Claims, 4 Drawing Sheets

US 6,700,838 B1

PLANAR COIL STRUCTURE FOR MAGNETO-OPTICAL HEAD

CROSS-REFERENCE TO A RELATED APPLICATION

This invention is based on U.S. Provisional Patent Application Serial No. 60/191,942 filed Mar. 24, 2000, entitled PLANAR WRITING COIL FOR OPTICAL ANTENNA ELECTRICAL AND MAGNETIC DESIGN filed in the name of Terry McDaniel. The priority of this provisional application is hereby claimed.

BACKGROUND OF THE DISCLOSURE

1. Field of the Invention

The invention relates to magneto-optical heads and, more particularly, the invention relates to coil structures that are used in magneto-optical heads.

2. Description of the Background Art

Disk drives are a known memory storage device in the computer industry. Magnetic disk drives are the most common type of disk drive, and use magnetic heads to write data to, and read data from, magnetic disks. Magneto-optical (MO) drives are another type of disk-based storage device. MO drives include MO heads that write data to, and read data from, an MO disk. Of great importance in MO disk drives is the ability to accurately read data into, and write data from, minute tracks on the MO disk using a laser.

MO heads typically include a microcoil for the purpose of magnetic field generation in thermomagnetic writing of an MO data storage medium. An example of such a structure is shown in U.S. Pat. No. 5,903,525 entitled "Coil for Use With Magneto-Optical Head" by McDaniel and Wang, incorporated herein by reference. Fabrication of an MO head, including a working planar microcoil, is challenging for mass production considering the precision and relatively small dimensions of the components of the MO head and disk drive.

Therefore, a need exists in the art for a planar coil structure of a magneto-optic (MO) head.

SUMMARY OF THE INVENTION

The present invention comprises a microcoil mounted to a read/write head in a magneto-optical (MO) data storage device. More specifically, the microcoil mounted to a read/write head in a magneto-optical head that utilizes a sub-micron optical antenna as a read/write transducer. The microcoil is affixed to the focusing lens of the MO head proximate a region where the light exits the focusing lens. The microcoil creates a source of a magnetic bias field that provides efficient generation of a dynamic writing field consistent with a driving current magnitude and frequency. The microcoil is also compatible with known low-cost batch fabrication processes.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

Figure 1:
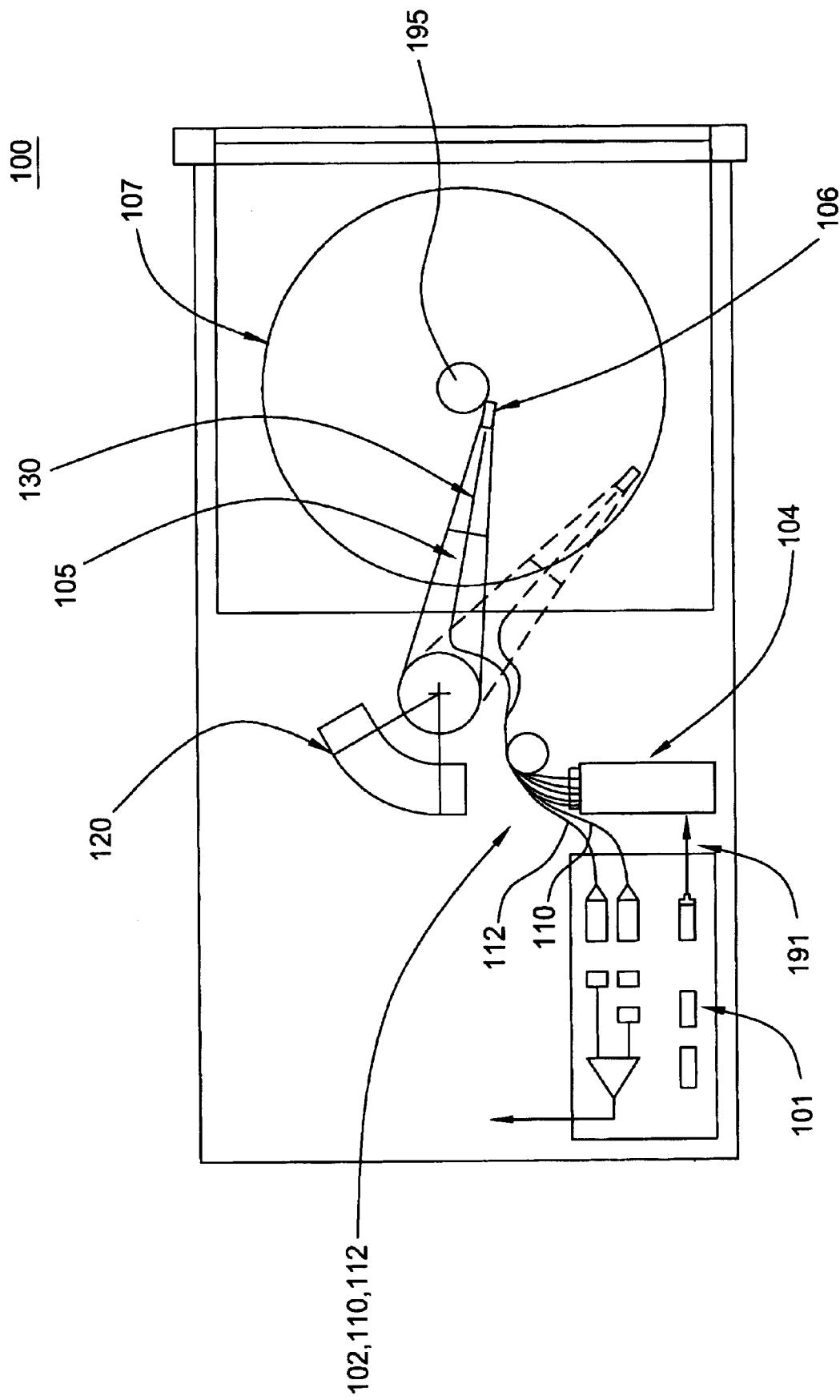
FIG. 1 shows a top view of one embodiment of a magneto-optical (MO) data storage system employing a MO head.

FIG. 1 depicts a schematic diagram of a magneto-optical (MO) data storage system 100, such as a MO disk drive. One embodiment of the MO data storage system 100 comprises a laser optics assembly 101, on optical switch 104, an actuator arm 105, a suspension 130, a set of double-sided MO disks 107, a rotary actuator magnet/coil assembly 120 and a MO head 106. The laser optics assembly 101 is optically coupled to an optical switch 104. One embodiment of the MO head 106 is fashioned as a set of Winchester-type flying MO heads. Each MO head 106 is configured and can be positioned to interact with one side of one MO disk 107. Each MO head 106 is coupled to a rotary actuator magnet/coil assembly 120 by a distinct respective actuator arm 105 and suspension 130 to position the MO head 106 over the surface of the MO disk 107 associated with that MO head.

In operation, the MO disk 107 is rotated by a spindle motor 195. Aerodynamic lift forces are generated between the MO head 106 and the MO disk 107 as the MO disk rotates. These aerodynamic lift forces are opposed by substantially equal and opposite spring forces applied by the suspension 130 on the MO head 106 toward the MO disk. The substantial equality in forces between the aerodynamic and the spring forces maintain the MO head 106 in a so-called flying state that is closely adjacent, e.g., approximately 1–20 micro-inches from, a surface of the MO disk 107. The MO head 106 is maintained between a minimum and maximum flying height over the surface of the MO disk 107 over a full radial stroke of the actuator arm 105 in a manner to limit contact between the MO head 106 and the MO disk 107. When not engaged in a reading or writing operation, the MO head 106 is statically disposed in a "storage" position remote from the surface of the MO disk 107.

As shown in FIG. 1, one embodiment of the laser optics assembly 101 controls the laser beam transmitted to, and receives the laser beam transmitted by the MO head 106. In this disclosure, the term "laser beam" is intended to describe the path of any radiation originating at a laser and being transmitted through passing through either fiber or air. The laser beam actually includes two laser beam portions: an incident laser beam portion and a return (reflected) laser beam portion. The laser optics assembly 101 generates the incident laser beam 191. The incident laser beam portion is generally linearly-polarized and originates from, e.g., a Fabry-Perot (FP) diode laser source and is directed toward the MO disk 107 via an optical fiber. The laser optics assembly 101 also receives return laser beams in a rotated polarization state (compared to the incident laser beam) over respective return optical fibers 110, 112 that travels from the MO disk 107 through the MO head 106. The particular polarization state of the return laser beam signal can be controlled in a manner to transmit information stored on the MO disk to the laser optics assembly during a reading operation. A single-mode polarization maintaining (PM) or low birefringence optical fiber 102 (FIG. 1) optically couples the optical switch 104 to each MO head 106. The return optical fibers 110, 112 that receive the respective return laser beams optically couple each head 106 to the laser optics assembly 101.

Figure 2:
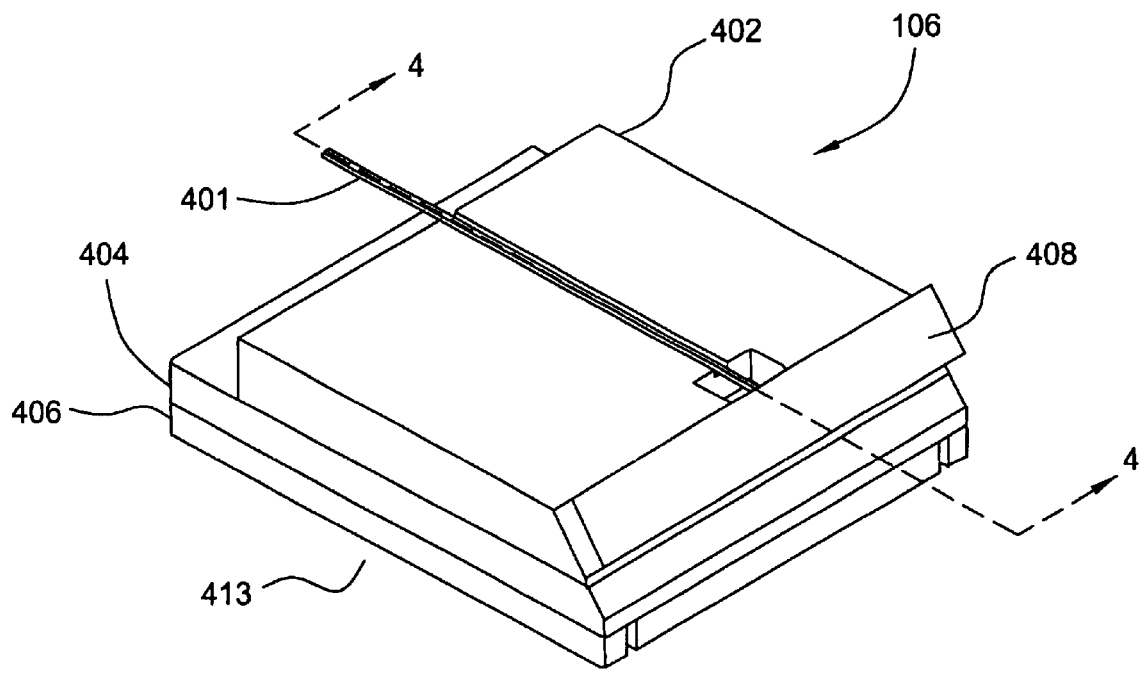
FIG. 2 shows a perspective view of one embodiment of MO head.
Figure 3:
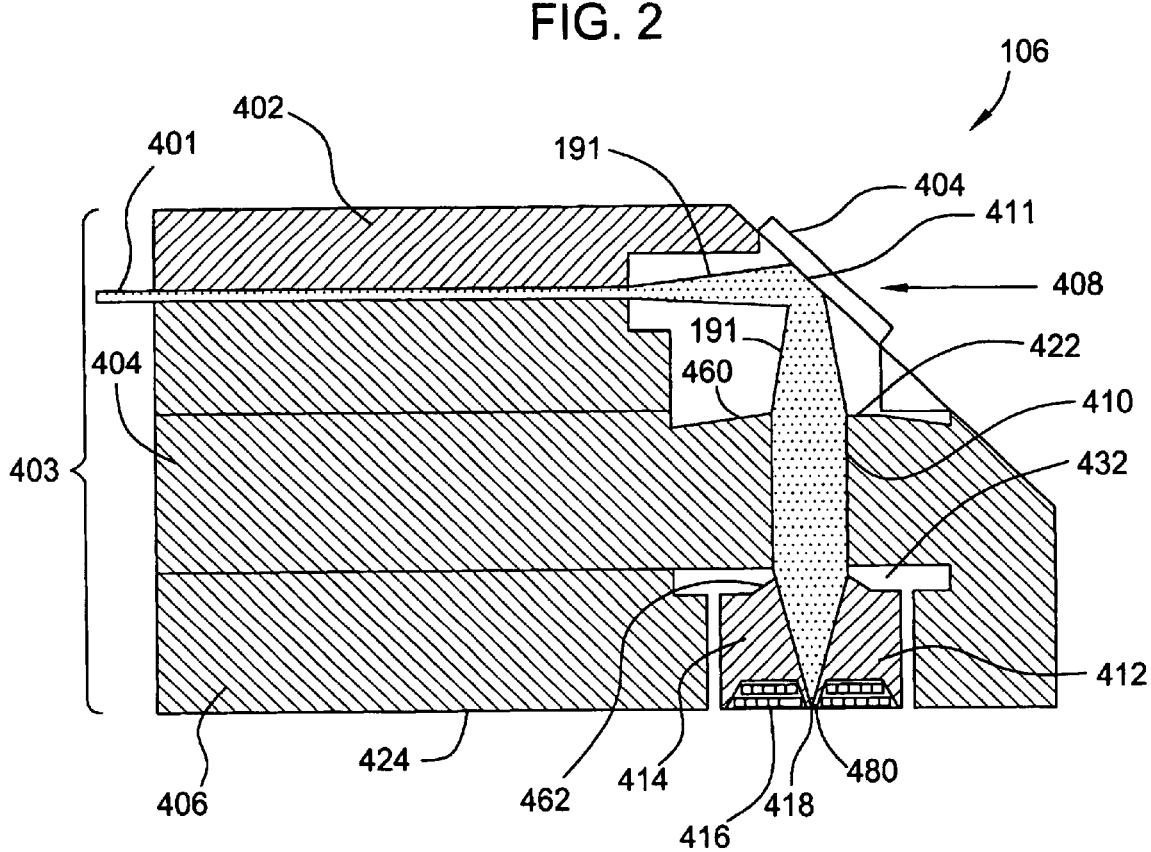
FIG. 3 shows a side cross-sectional elevational view of the MO head of FIG. 2.

A perspective view of one embodiment of MO head 106 is shown in FIG. 2. A side cross-sectional view of the MO head 106 taken along line 4—4 of FIG. 2 is shown in FIG. 3. The MO head 106 includes an optical fiber 401 (that transmits the incident laser beam 191 and the return laser beams) a plurality of wafers 402, 404, and 406, a mirror 408, a collimating lens 410, a focusing lens 412, an actuator 414, a planar micro coil structure 416, and an optical antenna 418. The wafers 402, 404 and 406 are affixed to one another to form a stack 403. The collimating lens 410 and the focusing lens 412 are referred to as a lens pair 422, and the lens pair 422 is configured to respectively collimate and focus light of the prescribed wavelength as produced by the laser optics assembly 101, e.g., having a laser wavelength of 1.55 $\mu$m. Light is applied to the MO head 106 via the optical fiber 401. In one embodiment, the optical fiber 401 is a 1.55 $\mu$m, low-birefringence, single mode optical fiber. One embodiment of the mirror 408 includes a mirror body 409 formed of a silicon body with the silicon body coated with a gold coating 411. The mirror 408 reflects the incident laser beam applied by the optical fiber 401 toward the lens pair 422, and also reflects the return laser beam from the lens pair 422 toward the optical fiber 401.

In one embodiment, the effective numerical aperture (NA) of the lens pair 422 is about 0.8. This NA corresponds to a focal spot size of about 1.0 $\mu$m Full-Width Half Maximum (FWHM) in silicon at the 1.55 $\mu$m laser wavelength. The collimating lens 410 collimates the laser beam applied by the fiber 401. The focusing lens 412 focuses the incident laser beam 191 passing through the collimating lens 410 onto the optical antenna 418. The optical antenna 418 is proximate and substantially coplanar with an air bearing surface 424. As such, the antenna 418 will be spaced from the disk by the gap formed between the surface 424 and the disk 107.

The planar micro coil structure 416 is integrated in the bottom of the focusing lens 412 proximate the optical antenna 418. The focusing lens 412 focuses the light beam onto the optical antenna 418 that is formed in the center of a bottom surface of the planar micro coil structure 416. The micro coil structure 416 defines an aperture 480 having a diameter of about 10 $\mu$m.

The collimating lens 410 has an aspheric surface 460 and a planar surface 462. The focusing lens 412 has an aspheric surface 464 and a planar surface 466. The planar surface 466 of the focusing lens supports the optical antenna 418. The planar surface 466 of the focusing lens is substantially co-planar with the air bearing surface 424 of the MO head 106.

The collimating lens 410 and the focusing lens 412 can both be fabricated using current silicon processing methods. The aspheric surfaces 460 and 464 in the respective collimating lens 410 and focusing lens 412 can be patterned in the silicon using reactive ion etching. The lenses 410, 412 are each polished as desired to decrease the height of the lens to the necessary lens thickness. This direct wafer-scale patterning allows thousands of lenses to be formed on a silicon wafer.

Spot size is chosen to maximize coupling of the laser beam to the optical antenna 418, and thereby also to maximize the output power re-radiated by the optical antenna 418.

The optical fiber 401 is actively aligned to the lens path during head assembly. In this alignment procedure, the distance between the fiber 401 and the collimating lens 410 is adjusted to maintain maximum coupling efficiency of back-reflected light from the focal plane returning through the single mode fiber. The x-y position of the fiber 401 is also adjusted to optimize the spatial overlap of the beam on the optical antenna.

The MO head 106 of FIG. 3 can both write data to, or read data from, the MO disk 107. The MO head 106 writes data on the MO disk 107 when the radiated field from the optical antenna 418 heats the magnetic layer on the MO disk 107. Heating the magnetic layer on the MO disk acts to lower the coercivity of a small region of the surface. The writing action allows the magnetic field generated by the planar micro coil structure 416 to reverse the magnetic moment of the magnetic layer in the heated region of the MO disk 107.

The MO head 106 reads data from the MO disk 107 when the radiated near field from the optical antenna 418 is reflected from the MO disk 107. During the reading action, the reversed magnetic moment can be differentiated from the non-reversed magnetic moment. The reflected, near field radiation propagates through the lens pair 422 towards the optical fiber 401. A standard differential detection technique is used to determine the sign of the Kerr rotation of the return light upon its receipt in the laser optics assembly 101.

In one embodiment, a unitary focusing lens/coil/optical antenna assembly 432 is provided including the focusing lens 412, the planar coil structure 416, and the optical antenna 418. The focusing lens/coil/optical antenna assembly 432 can be controllably displaced by the actuator 414. The actuator 414 preferably comprises, e.g., a servo motor that can precisely displace the focusing lens/coil/optical antenna assembly 432 in a sinusoidal motion. The accurate sinusoidal motion provided by displacement of the actuator 414 to effect focusing lens/coil/optical antenna assembly 432 can be utilized for track following at track densities of up to 250 ktpi (kilo-tracks-per-inch). One exemplary sinusoidal motion has a displacement of ±1.5 $\mu$m and a frequency of 18 kHz. Since the incident laser beam 191 is collimated after passing through the collimating lens 410, the focal spot of the incident laser beam can be controllably directed by the microactuator to remain overlapped with the optical antenna 418. Providing the actuator 414 to displace the focusing lens/coil/optical antenna assembly 433 eliminates the need for a complicated second stage servo to maintain overlap of the incident laser beam 191 relative to the optical antenna 418.

Figure 4:
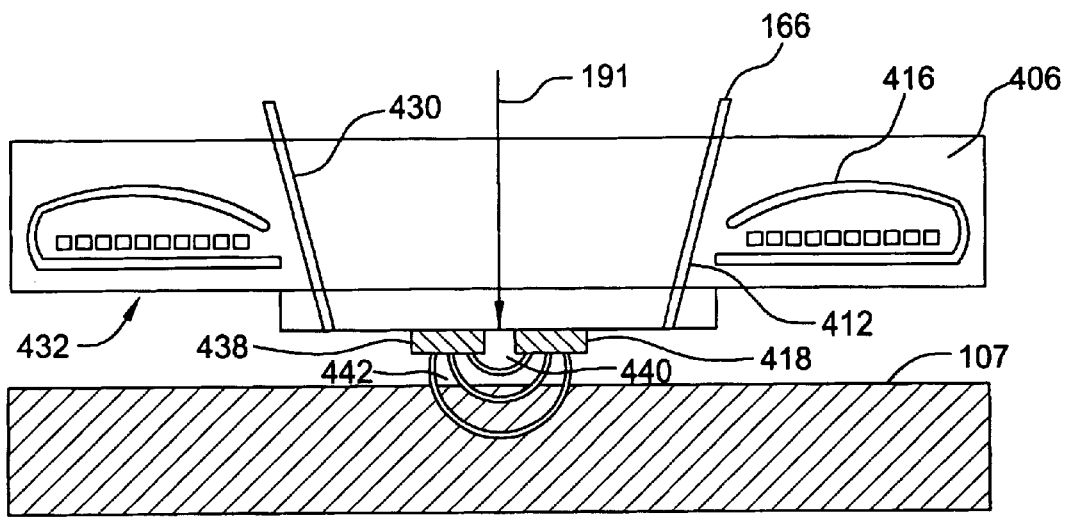
FIG. 4 shows an exploded view of one embodiment of the optical antenna of FIG. 3.

One embodiment of optical antenna 418, shown in FIG. 4, consists of a thin gold film structure 438 of submicron dimensions with a small aperture 440 formed at the center. The aperture has a width of about 50 nm, but may be as narrow as about 10 nm. Although one embodiment of the MO head uses an incident laser beam that has a focal spot diameter of about 1 $\mu$m, the optical antenna resolution is governed by the near field radiation 442 generated by the aperture 440. The pattern of the near field radiation generated by the aperture 440 can be configured to effect accurate writing and reading marks on the MO disk 107 with less than 100 nm spatial resolution that can result in mark densities on the MO disk 107 exceeding 100 Gb/in$^2$. The spatial resolution applied to the MO disk 107 is governed by the width of the aperture 440. The aperture 440 can be formed as small as 10 nm using currently available electron beam technology. Minimizing the aperture dimension enhances the resolution produced by the optical antenna 418 on the MO disk 107 to a level below the diffraction limit of the focussed incident laser beam.

Figure 5:
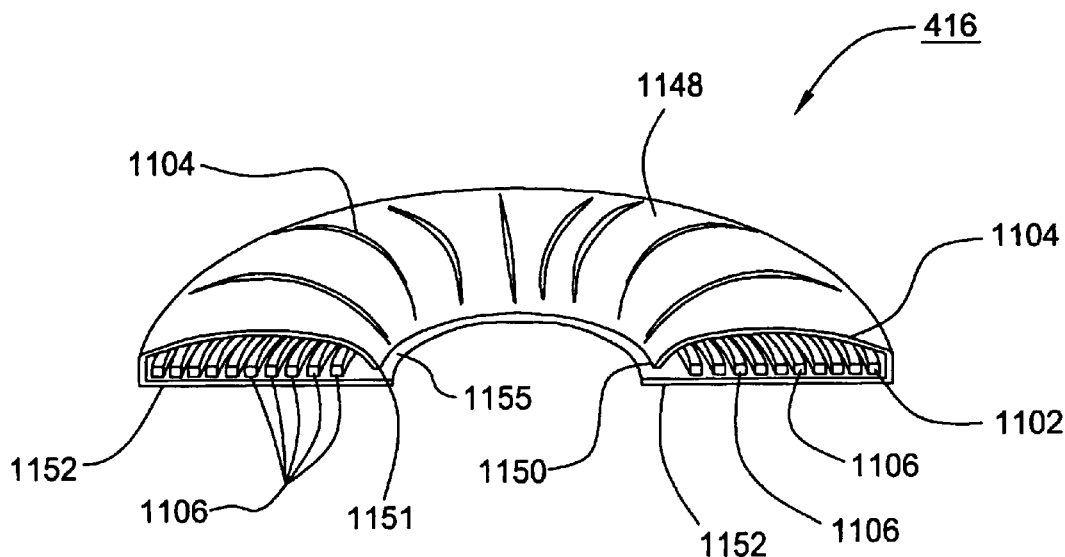
FIG. 5 shows a partial sectional perspective of one embodiment of an optical antenna of the type shown in the MO head of FIG. 3.

The coil 416 is formed such that its structure is that of a toroid with a center aperture. FIG. 5 is a perspective view of the coil 416 showing all of its elements. The coil structure 416 is comprised of wires 1106 wound into coils 1102 concentrically about a central aperture in a single plane and radiates outward. The wires 1106 are housed in a magnetically permeable housing (yoke) that concentrates the magnetic B field in the central aperture. The yoke is formed having an upper 1148 and lower 1152 section that encases the wires 1106. The upper 1148 and lower 1152 sections are joined about the exterior circumference of the toroid and are separated by an annular gap 1155 formed about the aperture's internal circumference. The annular gap 1155, which is contoured and unbroken, spans the entire center aperture. The wires 1106 are supported in coil form by a dielectric material 1105, preferably photo resist.

Using a 1.55 $\mu$m wavelength for the laser source 231 allows matching the laser excitation wavelength to the resonance of the optical antenna 418. This matching of wavelength results in an optical antenna being formed of features having dimensions that can be produced using current manufacturing technology. In one embodiment, both the collimating lens 410 and the focusing lens 412 are formed from silicon. Selecting the 1.55 $\mu$m laser wavelength is desired because this wavelength is within the transparency region of silicon. The lens pair 422 can thus be integrated with the actuator 414.

The planar micro coil structure 416 is integrated in the MO head 106, with the planar coil structure placed near the air bearing surface (ABS) of a flying slider (head). The purpose of the planar micro coil structure 416 is to generate a writing and erasing magnetic field at the position of the storage films on the disk recording medium 107. The position of the planar micro coil structure relative to the medium is to be determined by the placement of the planar micro coil structure 416 on the slider and the flying attitude of the MO head 106.

The embodiment of planar micro coil structure 416 shown in FIG. 5 comprises a coil 1102 and a yoke 1104. The yoke 1104 is formed of a magnetic material. The coil 1102 is configured to be nearly axisymmetric. The details of the shapes of the coil 1102 (spiral versus concentric "winding"; oval due to via connections versus circular) in one embodiment, displays second-order effects relative to meeting basic design requirements.

One embodiment of the planar micro coil structure 416 is configured in a right circular cylindrical volume whose outer radius is less than 75 $\mu$m and whose height is less than 15 $\mu$m. Furthermore, the micro planar coil structure 416 has a center aperture 430 to accommodate the passage of a converging focused light beam whose focal point lay within about one micrometer of the base plane of the planar micro coil structure 416. One embodiment of the conical light beam passing through the center aperture exhibits a half-angle of from 12 to 15 degrees, as indicated by lines 1170 in FIG. 7. This geometry, combined with anticipated tolerances on beam alignment and centration with respect to the aperture, defines a minimum allowable inner profile of the aperture.

The MO head 106 is configured so the outer surface of the focusing lens 412 is secured to the inner surface of the actuator 414. The planar micro coil structure 416 is integrated in, or attached to the outer surface of, the focusing lens 412. Therefore, any vertical displacement of the actuator 414 is thus transferred to the focusing lens 412 and the planar coil structure 416.

The conductor size of the coil 1102 is compatible with the anticipated current-carrying capacity of the planar coil structure 416. The yoke 1104 is configured with inner pole tips 1150, 1151. The thickness and placement accuracy of the inner pole tips 1150, 1151 of the magnetic yoke 1104 are configured to provide the desired B-field strength at the disk medium 107.

Figure 6:
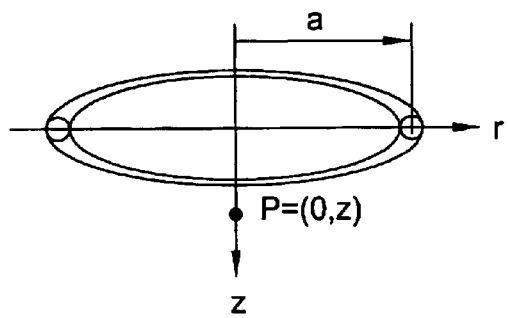
FIG. 6 shows a perspective view of a circular current loop for B-field generation.

Two components of the magnetic field produced by the planar micro coil 416 are (a) a field from the externally-supplied current applied to the conductor coil 1102, and (b) the magnetic material of the magnetic yoke 1104. To illustrate the magnetic field generated by the planar micro coil structure 416, consider FIG. 6 that illustrates a circular conductor (coil) of radius a. The cross-section of the conductor coil is considered for analysis purposes to be essentially point-like, i.e., a filamentary wire. The sources of the planar coil structure 416 lie in the half-plane Z less than 0. The magnetic field required in the half-plane Z is greater than 0. Typically, a minimum separation (along the Z-axis) is provided between the bounding plane of the source assembly and the field point P. This minimum separation is referred to as $Z_0$. The textbook expression for the magnetic induction on the axis of symmetry of the circular coil is:

$$B_z(r=0, z) = \frac{\mu_0 I a^2}{2(a^2 + z^2)^{3/2}}$$

The optimal coil radius maximizes the field $B_z$ at (r=0, Z=Zo). Setting the partial derivative with respect to a equal to zero and solving the resulting equation for a gives a $\alpha_{opt} = \sqrt{2z_O}$. Putting this optimal radius into the expression for $B_z$ gives $$B_z^{opt}(r=0, z_0) = \frac{\mu_0 I}{3^{3/2} z_0}$$

The optimum coil position of the planar coil structure subtends a half-angle of $\tan^{-1}(a/z_0) = \tan^{-1}\sqrt{2} = 54.7°$ from the field point P. If conducting wire is the only source of field available, we should bunch the conductor positions along the 54.7° line, and not displace Z far below the $Z_o$ location.

Electromagnetic principles indicate that magnetic material is a much stronger source of external field than a macroscopic current source. This principle reflects the remarkable strength of cooperative atomic currents. Consequently, amplifying the flux generation from a conductor using a well-shaped magnetic yoke (magnetic flux conductor) is more effective for external field generation purposes than magnet designs that rely on optimally placed conductive wires alone.

Use of a commercially-available finite-element magnetostatics simulation software (e.g., Ansoft Maxwell 2D and 3D) is helpful for optimizing the position of the wires 1106 of the coil 1102 relative to the size and shape of the yoke 1104, especially the pole tips 1150 and 1151. The software program simulates non-linear material magnetic properties. The cross-sectional area of each conductor turn 1106 was modeled as 2.5×3.5 $\mu$m$^2$. The main changes explored were in the geometry of the yoke, while the conductor array may have been occasionally rigidly shifted by increasing or decreasing the innermost radius of the array slightly. The changes in the yoke 1104 included first the addition of a flux return layer forming the bottom of the planar coil structure at the Z approximately equals 0 position.

The net result of optimizing the planar coil structure 416 results in total self-inductance approaching approximately 78 nH, including the leads, and a field output in the media at nominal operating current (50 mA) of 570 G. This estimate does not involve a soft magnetic underlayer in the medium 107, but only a single magnetic storage film with non-magnetic thin film over- and under-layers resting atop the disk substrate.

Figure 7:
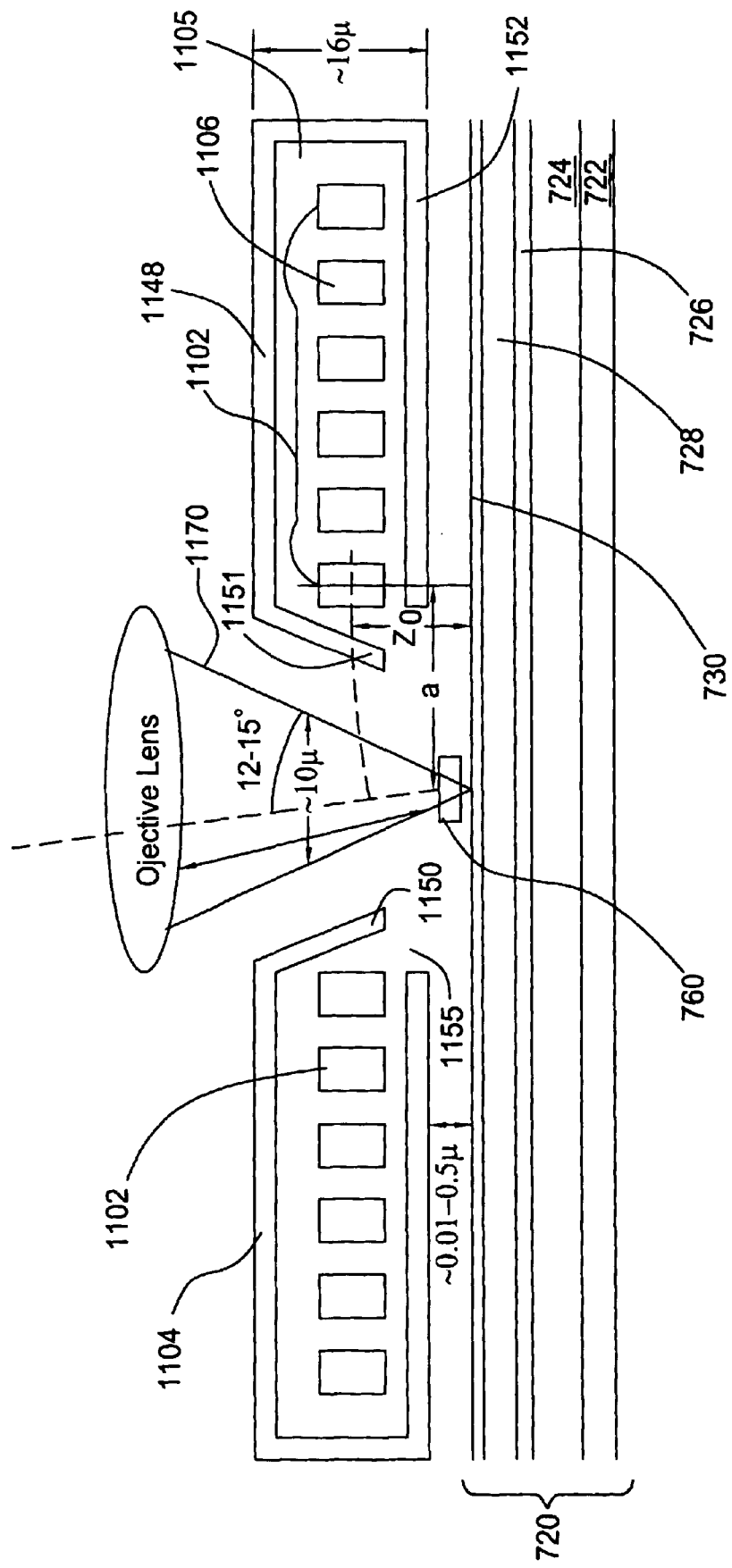
FIG. 7 is a vertical section view of the yoke and storage medium used in an exemplary embodiment of the invention.

FIG. 7 is a vertical section of the antenna of FIG. 5 shown in combination with a preferred recording medium. Thus the figure shows yoke 1104 with upper 1148 and lower 1152 housing sections surrounding wires 1106 forming coil 1102. The yoke focuses light beam rays 1170 on medium film structure 710. The medium comprises, in sequence built up on substrate 722, a soft underlayer 724; a buffer layer 726; a magnetic film 728; and finally an overcoat 730.

A soft magnetic underlayer 724 of thickness of approximately 300 nm having the properties of $Ni_{0.81}Fe_{0.19}$ permalloy is a further embodiment. Such a soft underlayer provides an improvement in the magnetic circuit flux closure of the coil portion efficiency across the air gap region 760 between the pole tips 1150, 1151 resulting in a boost of the achievable $B_z$ in the media to about 1000 G, again using 50 mA current.

The use of a soft underlayer in the medium can nearly double the bias field strength in the storage layer without affecting the self-inductance of the planar coil structure. An enhanced efficiency of the planar coil structure results in a significant reduction in structure complexity and performance. The magnetic, thermal, and possibly optical behavior of the medium would need to be re-optimized if the soft underlayer is selected.

The desired nominal peak field magnitude at the recording layer on the disk medium on the center axis of the planar coil structure is 500 Oersteds at the nominal operating current of the planar coil structure. The field direction is within ±15° of perpendicular to the disk plane. These recording conditions should be achievable with either positive or negative field polarity.

The planar coil structure must not interfere in any way with the propagating light on its passage from the objective lens past the optical antenna to the disk, or on its return path from the disk to the objective.

While foregoing is directed to the preferred embodiment of the present invention, other and further embodiments of the invention may be devised without departing from the basic scope thereof, and the scope thereof is determined by the claims that follow.

What is claimed is:

1. A magneto-optical head comprising a light source focused through an aperture toward a recording medium comprising:
    a coil substantially surrounding the aperture and producing a magnetic field; and
    a yoke for supporting the coil, wherein the yoke comprises an annular gap positioned adjacent to the aperture.

2. The coil structure of claim 1, wherein the yoke is a magnetic material.

3. The coil structure of claim 1, wherein the coil is a toroid comprising one or more turns of a conductor.

4. The coil structure of claim 3, wherein the yoke circumscribes the coil to form a toroidal enclosure where the annular gap is formed in an inner surface of the enclosure.

5. The coil structure of claim 4, wherein the thickness of the yoke is optimized to minimize the self-inductance.

6. The coil structure of claim 1, wherein the yoke comprises at least one pole tip.

7. A magneto-optical head comprising:
    an optical antenna;
    a lens for focusing a light beam upon an aperture in the optical antenna; and
    a micro coil means for producing a magnetic field proximate the aperture and having a yoke with an annular gap for concentrating the magnetic field within the aperture.

8. A system for optimizing the efficiency of recording in a magneto-optical recording system comprising a head supported over the surface of a disc for providing a light to a focusing lens for focusing the light on the surface of a recording medium, and a micro coil structure for magnetically recording and reading on the surface of the disc comprising a coil substantially surrounding a center aperture in which a magnetic field is to be concentrated and a yoke for supporting the coil and focusing the magnetic field on the surface of the recording medium, the yoke comprising an annular gap positioned adjacent to the center aperture.

9. A system as claimed in claim 8 wherein the coil comprises a toroid formed of wires of the coil surrounding the center aperture through which the light propagates.

10. The system of claim 9 wherein wires of the coil are wound substantially concentric about the center aperture in a single plane and radiating outward.

11. The system of claim 10 wherein the coil is housed in the yoke that concentrates the magnetic field generated by energization of the coil directionally toward the center aperture.

12. The system of claim 10 wherein the yoke formed having an upper and lower section that encase the wires of the coil.

13. A system as claimed in claim 12 wherein the upper and lower sections are joined about the exterior circumference of the toroidal coil and separated by the annular gap formed about an internal circumference of the center aperture.

14. A system as claimed in claim 13 wherein the annular gap circumscribes the center aperture.

15. A system as claimed in claim 14 wherein the wires are supported in the yoke by a dielectric material.

16. A system as claimed in claim 15 wherein the dielectric material comprises a photo resist.

17. A system as claimed in claim 16 wherein the coil is supported immediately adjacent the recording medium.

18. A system as claimed in claim 17 wherein the head further comprises an optical antenna and the excitation wavelength of a laser source for the light is matched to the resonance of the optical antenna.

19. The system of claim 11 wherein the medium comprises in sequence beginning farthest from the yoke: a substrate, a soft magnetic underlayer, a buffer layer, a magnetic film and an overcoat.

20. A system as claimed in claim 18 wherein the coil is integrated to, in, or attached to an outer surface of the focusing lens and the focusing lens is coupled to an actuator, where any vertical displacement of the actuator is transferred to the focusing lens and the coil.

\* \* \* \* \*

UNITED STATES PATENT AND TRADEMARK OFFICE
CERTIFICATE OF CORRECTION

PATENT NO. : 6,700,838 B1
DATED : March 2, 2004
INVENTOR(S) : McDaniel

It is certified that error appears in the above-identified patent and that said Letters Patent is hereby corrected as shown below:

<u>Title page,</u>
Item [*] Notice, delete the phrase "by 178 days" and insert -- by 143 days --

Signed and Sealed this

Twelfth Day of October, 2004

JON W. DUDAS
*Director of the United States Patent and Trademark Office*